(12) United States Patent
Hayami et al.

(10) Patent No.: US 7,967,708 B2
(45) Date of Patent: Jun. 28, 2011

(54) CHAIN GUIDE FOR USE IN ENGINE

(75) Inventors: Atsushi Hayami, Osaka (JP); Tomoya Iwata, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 429 days.

(21) Appl. No.: 12/128,175

(22) Filed: May 28, 2008

(65) Prior Publication Data

US 2009/0036242 A1 Feb. 5, 2009

(30) Foreign Application Priority Data

Jul. 31, 2007 (JP) .................................. 2007-200138

(51) Int. Cl.
*F16H 7/08* (2006.01)
(52) U.S. Cl. ........................................ 474/111; 474/140
(58) Field of Classification Search .................. 474/111, 474/140
See application file for complete search history.

(56) References Cited

U.S. PATENT DOCUMENTS

| 5,318,482 | A | 6/1994 | Sato et al. | |
|---|---|---|---|---|
| 6,758,777 | B2 * | 7/2004 | Young | 474/140 |
| 6,939,259 | B2 | 9/2005 | Thomas et al. | |
| 7,163,479 | B2 * | 1/2007 | Young | 474/140 |
| 7,476,169 | B2 * | 1/2009 | Konno | 474/140 |
| 7,524,254 | B2 * | 4/2009 | Konno | 474/111 |
| 2006/0040774 | A1 | 2/2006 | Hirayama et al. | |
| 2006/0172835 | A1 * | 8/2006 | Konno | 474/111 |
| 2006/0205548 | A1 * | 9/2006 | Konno | 474/111 |

FOREIGN PATENT DOCUMENTS

| DE | 195 07 770 A1 | 3/1995 |
|---|---|---|
| DE | 103 33 077 A1 | 7/2003 |
| EP | 1 471 285 A1 | 10/2004 |
| GB | 2 261 276 A | 5/1993 |
| JP | H03-2952 | 1/1991 |
| JP | 10-292855 | 11/1998 |
| JP | 2004-60801 A | 2/2004 |
| JP | 2004-360766 A | 12/2004 |
| JP | 2006-125525 A | 5/2006 |
| JP | 2007-040331 | 2/2007 |
| JP | 2007-40331 A | 2/2007 |

* cited by examiner

*Primary Examiner* — Sang Kim
(74) *Attorney, Agent, or Firm* — Howson & Howson LLP

(57) ABSTRACT

A chain guide is composed of a resin shoe engageable with an aluminum base frame. The shoe has a hook formed at a chain entry end for engagement with a chain entry end of the base frame, and a C-shaped hook at the chain exit end engageable with a side edge of the base frame. The shoe is engaged with the base by first engaging the C-shaped hook with the side edge of the base frame, then flexing the chain entry end of the shoe until the hook at the chain entry end can receive the chain entry end of the base. The shoe is moved a short distance toward the chain exit end of the base until a projection formed on a back surface of the shoe near the chain entry end snaps into a depression formed on a front surface of the base frame, locking the shoe and base together.

3 Claims, 11 Drawing Sheets

CHAIN GUIDE FOR USE IN ENGINE

CROSS-REFERENCE TO RELATED APPLICATION

This application claims priority on the basis of Japanese patent application 2007-200138, filed Jul. 31, 2007. The disclosure of Japanese application 2007-200138 is hereby incorporated by reference.

FIELD OF THE INVENTION

The invention relates to a chain guide, which is either fixed, or movably attached, to an engine, for guiding, or both guiding and maintaining tension in, an engine timing chain.

BACKGROUND OF THE INVENTION

A typical conventional chain guide for an automobile engine, is in the form of a pivoted lever in which a shoe, in the form of a convex strip of synthetic resin, is fitted to an aluminum base and both the shoe and the base have proximal end portions that receive a common shaft on which the lever is pivoted. An example of such a chain guide is described in Japanese Laid-Open Patent Publication No. Hei. 10-292855.

In the conventional tensioner lever, after the resin shoe is fitted to the base, the proximal end portions of the shoe and base must both be connected to the common shaft on which they are pivoted, and it is their connection to the common shaft that prevents them from becoming disconnected from each other. Thus, assembly and installation of the conventional tensioner require the difficult step of maintaining openings of the shoe and base in alignment while fitting the shoe and base onto a common pivoting shaft. A further problem is that a locking portion, which prevents the shoe from floating up with respect to the base, must be sufficiently long to take into account the influence of thermal expansion and shrinkage, and consequently care must be taken in production of the tensioner lever to ensure high accuracy in the sizes of the components, especially at the location of the locking portion.

Accordingly, an object of the invention is to provide a chain guide for use in an engine, which provides for smooth sliding contact with a transmission chain, in which the requirement for size accuracy in the production of the parts is relaxed, and in which mounting of the shoe onto the base is made easy, while unintended disconnection of the shoe from the base, both during assembly, and during use of the chain guide, is reliably prevented.

SUMMARY OF THE INVENTION

The chain guide in accordance with the invention comprises an elongated shoe having a front surface for sliding contact with a transmission chain travelling along the direction of elongation of the shoe and a back surface opposite from said front surface, and an elongated base for supporting the shoe. The base has a front surface engageable with the back surface of the shoe along the direction of elongation of the shoe, and opposite chain entry and chain exit ends spaced from each other along the direction of elongation of the base, whereby the base can be mounted so that a traveling chain moves from the chain entry end toward the chain exit end. The front surface of the base also has a depression formed therein. The shoe has a chain entry end engageable with the chain entry end of the of the base, a chain exit end engageable with the chain exit end of the base, and a projection on the back surface of the shoe, the projection being engageable with the depression in the front surface of the base.

The depression is preferably spaced toward the chain entry end of the base from a location mid way between the chain entry and chain exit ends of the base, and projection is spaced toward the chain entry end of the shoe from a location mid way between the chain entry and chain exit ends of the shoe.

The projection and depression are preferably formed with locking surfaces that are mutually engageable to limit sliding movement of the shoe relative to the base in a direction toward the chain entry end of the base, thereby preventing disconnection of the shoe from the base.

The chain entry end of the shoe preferably includes a hook engageable with the chain entry end of the base, and a C-shaped hook is preferably formed on the shoe adjacent the chain exit end of the shoe. The C-shaped hook extends perpendicular to the direction of elongation of the shoe so that the hook can receive a side edge of the base.

The base also preferably includes a pair of opposed, parallel, side wall ribs extending from the front surface of the base. The ribs are elongated in the direction of elongation of the base, and spaced from each other by a distance substantially equal to the width of the shoe so that the ribs can prevent lateral movement of the shoe with respect to the base.

Engagement of chain entry ends of the base and shoe and engagement of the chain exit ends of the base and shoe prevent floating up of the shoe with respect to the base, and the engagement of the projection of the shoe with the depression in the base, restricts excessive longitudinal shift of the shoe with respect to the base during assembly. Thus, the mounting of the shoe onto the base is made easy, while and inadvertent disconnection of the shoe from the base during the incorporation of the shoe onto the base is reliably avoided.

By positioning the depression and projection toward the chain entry ends of the base and shoe, flexion of the portion of the shoe adjacent its entry end can be utilized more effectively during incorporating of the shoe onto the base to engage the chain entry end of the shoe with the chain entry end of the base.

Furthermore since the arrangement distance from the chain entry ends of the base and shoe and to the locations of the projection and depression is short, the chain guide is resistant to the influence of thermal expansion and shrinkage of the shoe, the requirement for accuracy in production of parts is relaxed, and excellent dimensional stability can be obtained.

By forming the projection and depression with locking surfaces that are mutually engageable to limit sliding movement of the shoe relative to the base in a direction toward the chain entry end of the base, excessive shift of the shoe toward the chain entry side base during assembly is restricted, and advertent disconnection of the shoe from the base is reliably prevented.

When the chain entry end of the shoe includes a hook engageable with the chain entry end of the base, the hook structure prevents excessive shift of the shoe with respect to the to the chain entry end of the base. Thus, reliable prevention of disconnection of the shoe from the base is achieved.

When a C-shaped hook is formed on the shoe adjacent the chain exit end of the shoe, and the C-shaped hook extends perpendicular to the direction of elongation of the shoe so that the hook can receive a side edge of the base, the C-shaped cross-section of the hook structure allows sliding movement of the shoe relative to the chain entry end of the base. The C-shaped hook structure facilitates engagement of the shoe with the base, and avoids thermal strain due to the influence of thermal expansion and shrinkage, enabling the transmission chain to travel smoothly in sliding contact with the chain guide.

When the base includes a pair of opposed, parallel, side wall ribs extending from the front surface of the base, and the ribs are elongated in the direction of elongation of the base, and spaced from each other by a distance substantially equal to the width of the shoe, the ribs can prevent lateral movement of the shoe with respect to the base, so that stabilized sliding travel of the transmission chain can be attained, and, at the same time, the ribs can improve the strength of the base.

DETAILED DESCRIPTION OF THE PREFERRED EMBODIMENTS

Figure 1:
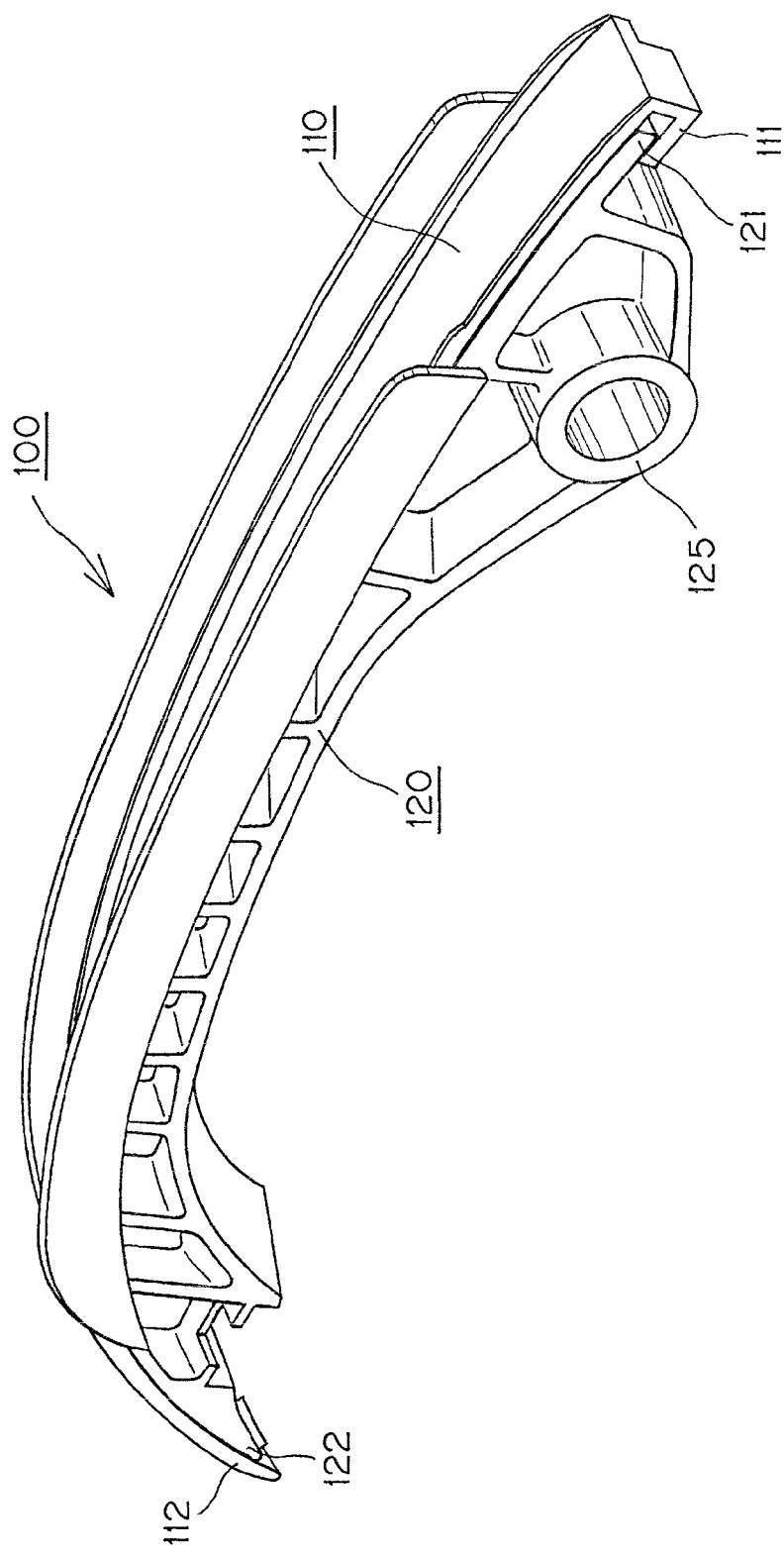
FIG. 1 is a perspective view of a chain guide in accordance with the invention.
Figure 2:
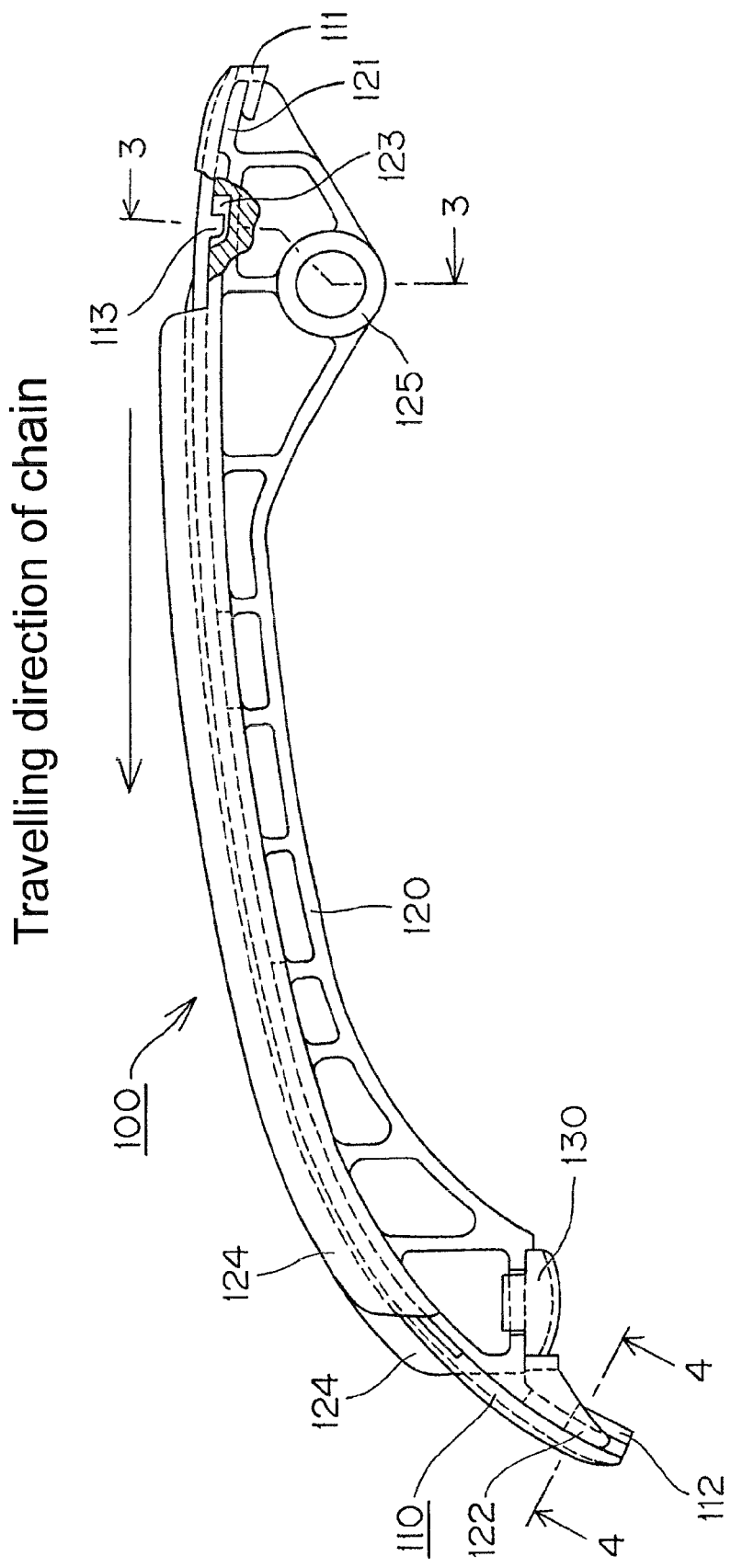
FIG. 2(a) is a side elevation of the chain guide.
FIG. 2b is a bottom plan view of the chain guide of FIGS. 1 and 2(a)
Figure 2:
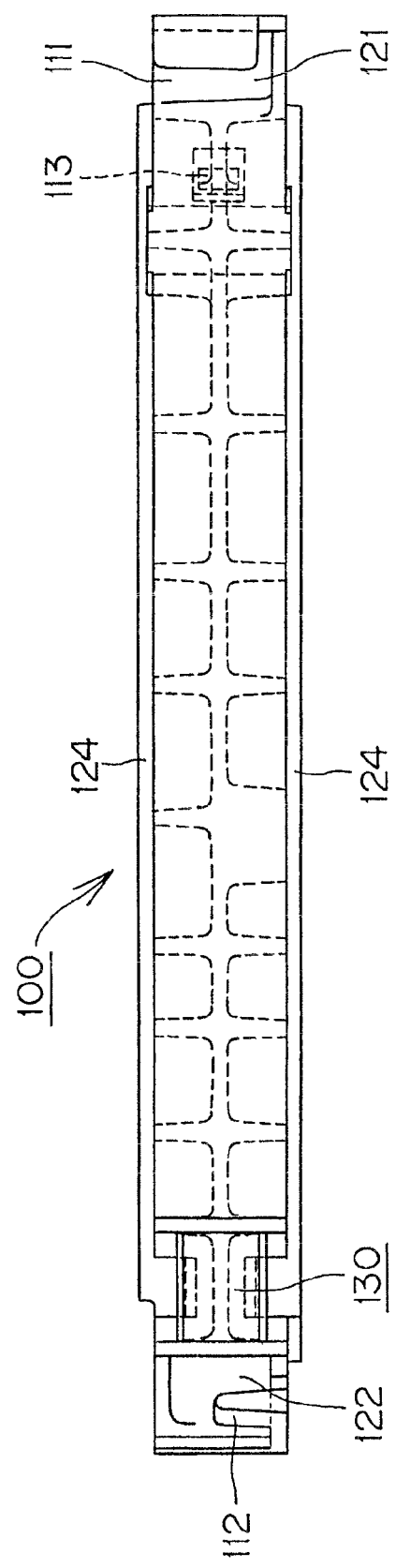
Figure 3:
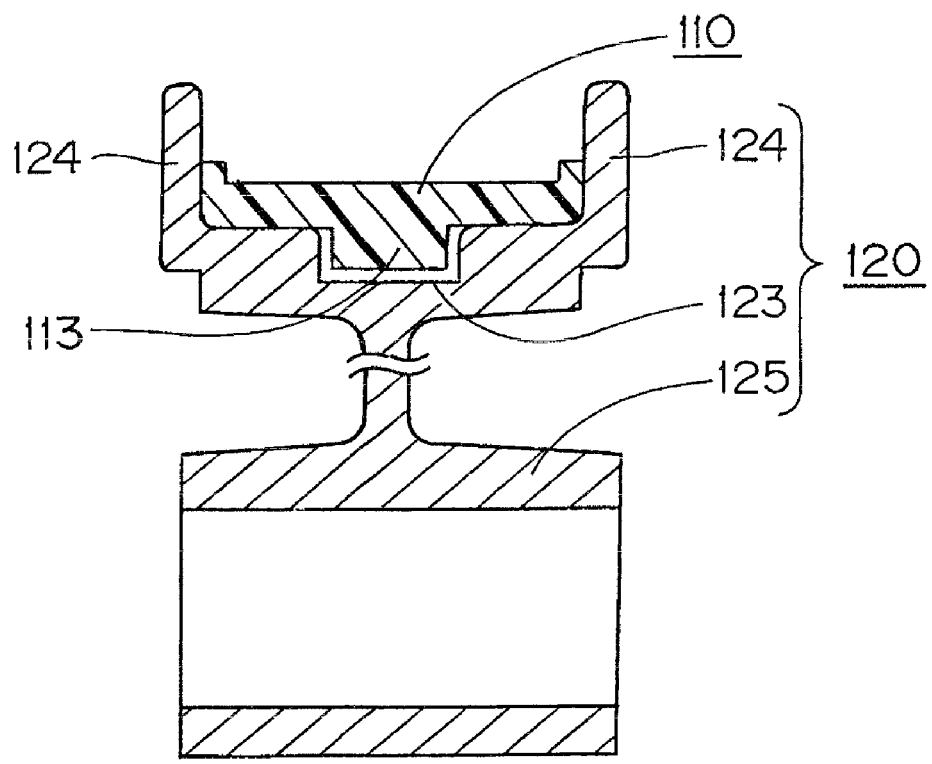
FIG. 3 is a sectional view taken on section plane 3-3 in FIG. 2(a)
Figure 4:
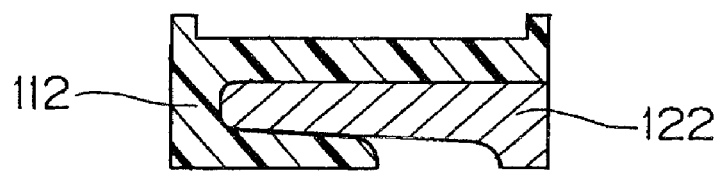
FIG. 4 is a sectional view taken on plane 4-4 in FIG. 2(a)
Figure 5:
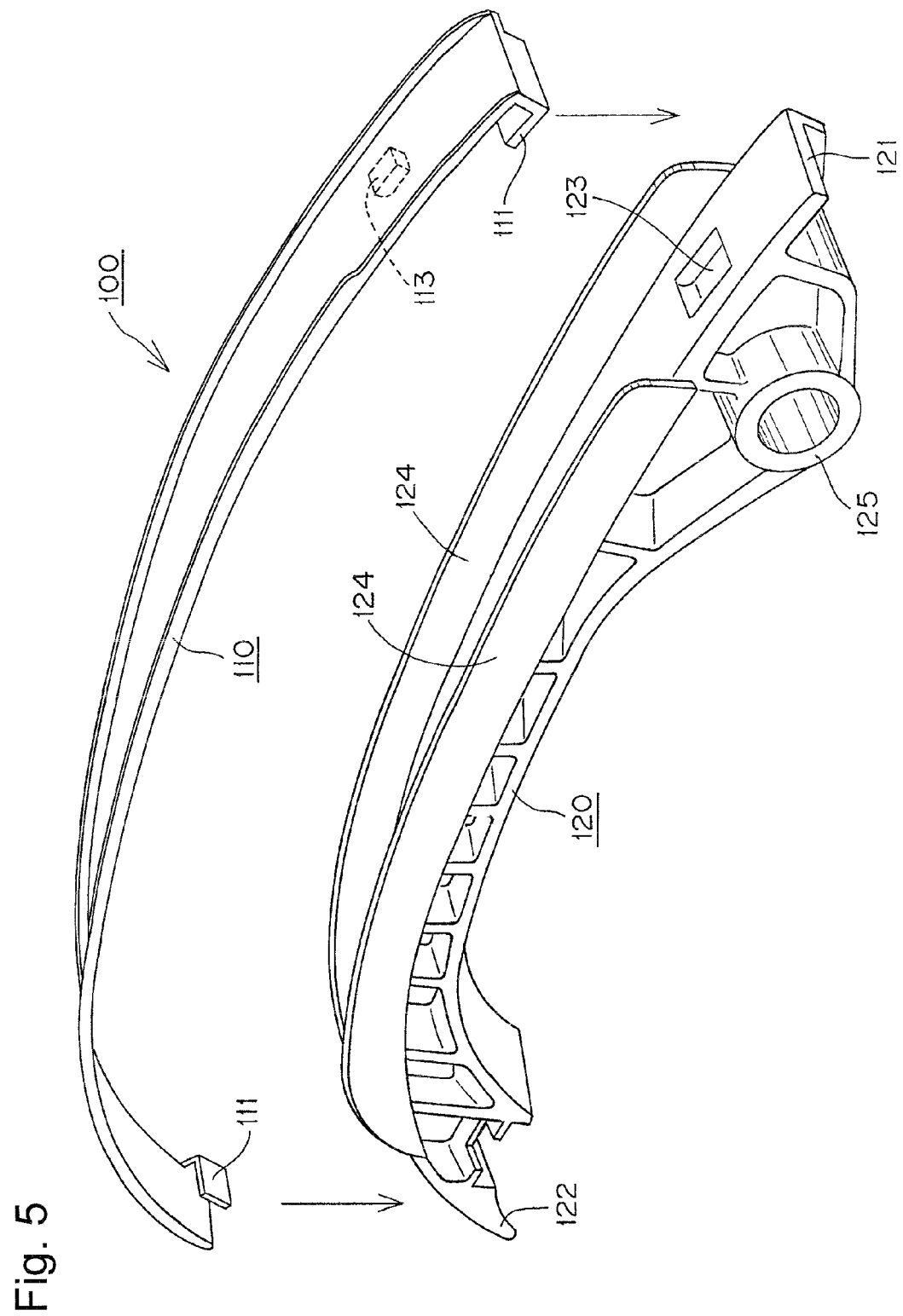
FIG. 5 is an exploded view of the chain guide.

The chain guide of the invention can be a fixed guide, for guiding a transmission chain in an engine, or a movable guide for guiding the chain and at the same time maintaining tension in the chain.

The shoe can be composed of any material that exhibits endurance and can achieve smooth sliding contact with a traveling transmission chain in the high temperature environment of an engine. Resins such as polyamide 6, polyamide 46, polyamide 66, polyacetal resin, and the like, are preferred as materials for the shoe.

For the base, any material can be used that exhibits endurance under changes in tension of a transmission chain in a high temperature environment. Various synthetic resins such as glass fiber-reinforced polyamide resins and the like, and metals such as aluminum and the like, are preferable as materials for the base.

Although the principles of the invention are applicable both to movable guides and fixed guide, the invention will be described in with reference to a movable guide 100 in FIGS. 1-12. In FIGS. 6-12, the direction of chain travel relative to the guide is denoted by arrows C.

The movable guide 100 is a pivoted guide which maintains chain tension while in sliding contact with a transmission chain which circulates between a driving sprocket and one or more driven sprockets in an engine. The guide 100 includes an elongated polyamide resin shoe 110, having a convex, generally arc-shaped, sliding contact surface, which, when installed in an engine, is in sliding contact with a transmission chain (not shown) traveling along the longitudinal direction of the guide. The shoe does not need to have a constant radius of curvature, and its radius of curvature at its ends, especially at its chain exit end, is typically smaller than its radius of curvature at an intermediate location between its ends.

The guide 100 also comprises an elongated aluminum base 120, having a generally arc-shaped supporting surface, conforming to, and supporting, a back surface of the shoe 110 along the direction of elongation of the guide.

The shoe 110 has a chain entry end portion 111, which is first engaged with an approaching portion of a chain, which is engaged with a chain entry end portion of the base 120. The shoe also has a chain exit end portion 112, which is engaged with a chain exit end of the base 120. The concave back surface of the shoe engages with convex front supporting surface of the base 120. As seen in FIG. 2(a), a projection 113 on back side of the shoe enters a depression 123 formed in the front surface of the base.

The chain entry end portion 111 is formed with a hook which engages the chain entry end 121 of the base 120. The hook structure prevents excessive shift or drawing of the shoe 110 toward the chain exit end of the base 120. Thus, inadvertent disconnection between the shoe 110 and the base 120 is reliably prevented.

A C-shaped hook is preferably formed on the shoe adjacent the chain exit end portion 112 of the shoe. The C-shaped hook extends perpendicular to the direction of elongation of the shoe so that the hook can receive a side edge of the base 120. Because the hook extends perpendicular to the direction of elongation of the base, The hook can slide longitudinally along the side edge of the base. Thus the connection of the shoe 110 with the base 120 is facilitated, and the influence of the thermal expansion and shrinkage is eliminated, so that the transmission chain can travel smoothly in sliding contact with the shoe 110 without generating abnormal strain in the shoe.

The insides of the hooks formed at the chain entry and chain exit ends of the shoe are preferably chamfered, or subjected to "R processing," so that they can be smoothly engaged with the base 120 during attachment of the shoe.

The base 120 includes a chain entry end portion 121, which engages with the chain entry engagement portion 111 of the shoe 110, a chain exit end portion 122, which engages with the chain exit end portion 112 of the shoe, and a depression 123, which engages with a projection 113 on the back side of the shoe.

The base 120 also includes a pair of right and left side wall ribs 124, which occupy spaces on both sides of the shoe, and limit lateral shift of the shoe 110, so that stable sliding contact of a transmission chain on the shoe can be attained. At the same time, these ribs improve the strength of the base.

As shown in FIG. 1, a boss 125 is formed in the base. This boss has a through hole for receiving a mounting shaft on which the guide is pivoted. The mounting shaft can be, for example, a cylindrical portion of a shoulder bolt threaded into an engine block. A resin pad 130, shown in FIGS. 2(a) and 2(b) is provided on the base for abutment with the plunger of a hydraulic tensioner which exerts a force on the pivoting lever.

The projection 113 on the back side of the shoe, and the depression 123 on the front side of the base, are preferably disposed adjacent the chain entry ends of the shoe and base, at least at a location between a point midway between the chain entry and chain exit ends of the lever and the entry ends of the shoe and base. Positioning of the projection and depression near the entry ends facilitates engagement of the shoe with the base. Furthermore, since the distance between the chain entry end 111 of the shoe 110 and projection 113 is shorter than the distance between the chain exit end and the projection 113, the shoe is resistant to the influence of thermal expansion and shrinkage, accuracy in production of parts is less critical, and excellent dimensional stability is obtained.

As seen in FIGS. 8-12, the projection 113 of the shoe 110 and the depression 123 in the base 120 respectively include disconnection-preventing locking surfaces 113a and 123a, which positively stops relative movement of the shoe 110 toward a chain entry end of base 120. Projection 113 has a rounded surface 113b facing the chain exit end of the shoe.

The projection 113 of the shoe and the depression 120 on the base are brought into engagement with each other by the sequence of relative movement depicted in FIGS. 8-12. The disconnection-preventing locking surfaces 113a and 123a prevent excess shift of the shoe 110 toward the chain entry end of the base 120, so that in advertent disconnection of the shoe 110 from the base 120 can be reliably prevented.

The depression 123 is longitudinally longer than the projection 113, allowing some relatively movement of the shoe relative to the base during assembly of the chain guide.

Figure 6:
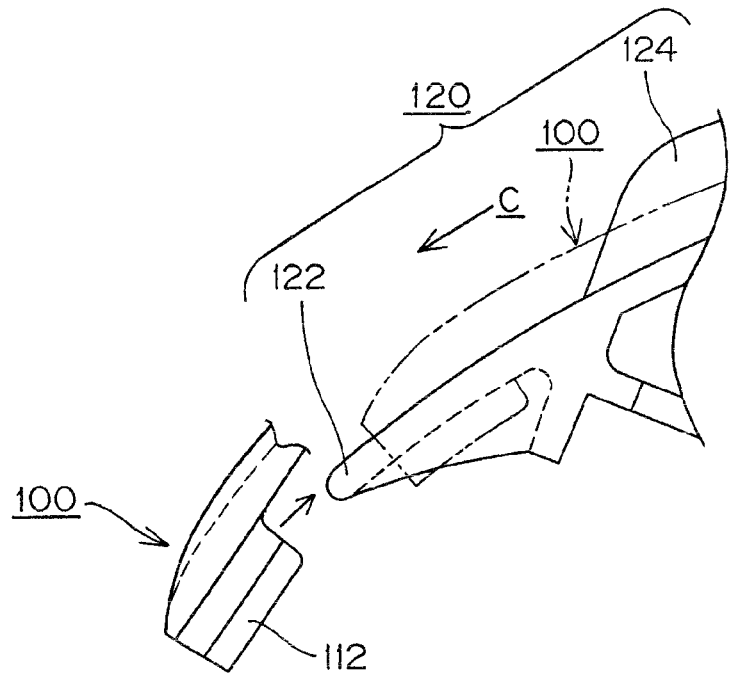
FIG. 6 is an exploded view showing an exit end portion of the chain guide with the exit end engagement portion of a shoe about to be engaged with the base of the chain guide.
Figure 7:
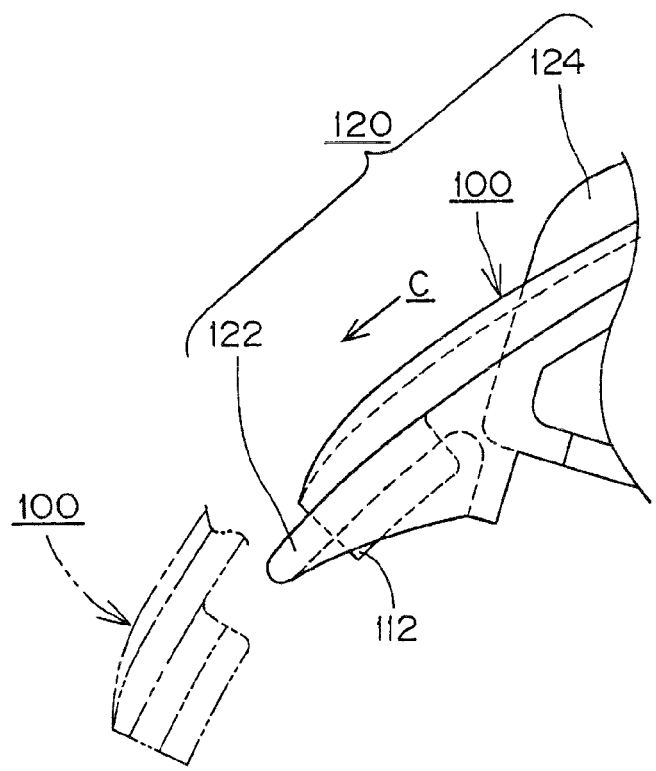
FIG. 7 is an exploded view showing the exit end portion of the chain guide with the exit end engagement portion of a shoe engaged with the base of the chain guide.

In a first step in the assembly of the guide, as shown in FIG. 6, the chain exit end portion 112 of the shoe 110 is positioned for engagement with the base 120. The end portion 112 is then engaged with the chain exit portion 122 of the base by pushing the chain exit end of the shoe toward the chain exit end of the base, and at the same time engaging the C-shaped hook adjacent the chain exit end with a side edge of the base, as shown in FIG. 7.

Figure 8:
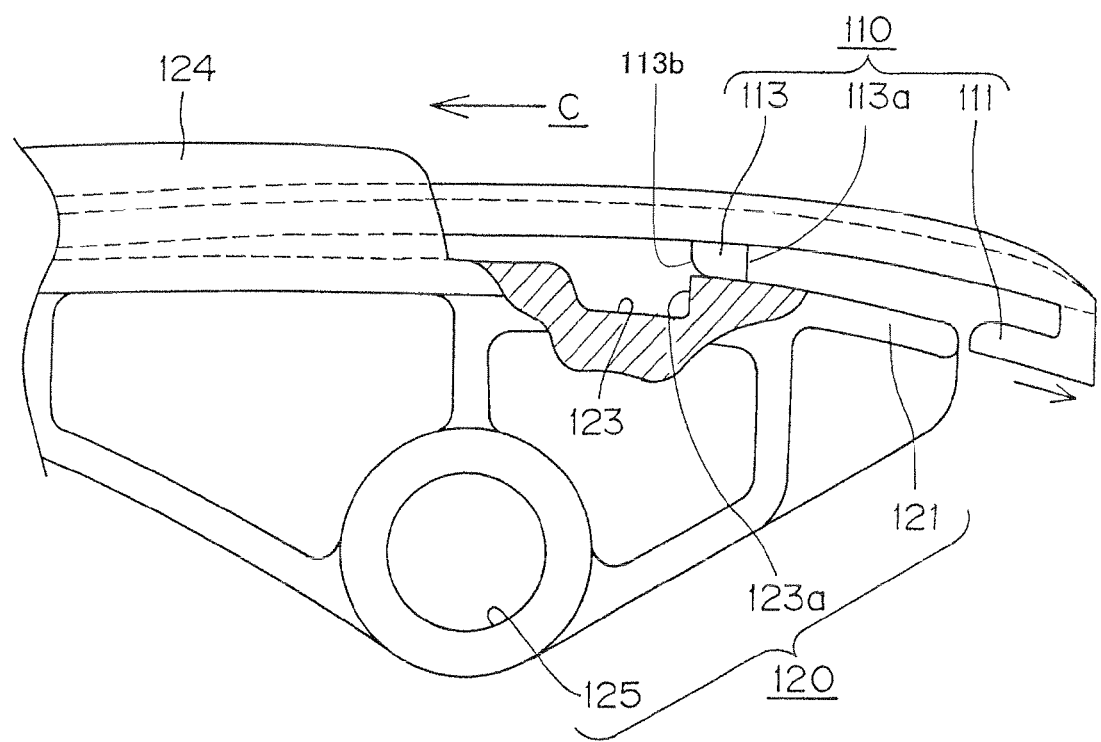
FIG. 8-12 are partially broken away side elevational views showing successive steps in the engagement of a shoe with the entrance end engagement portion of the base.
Figure 9:
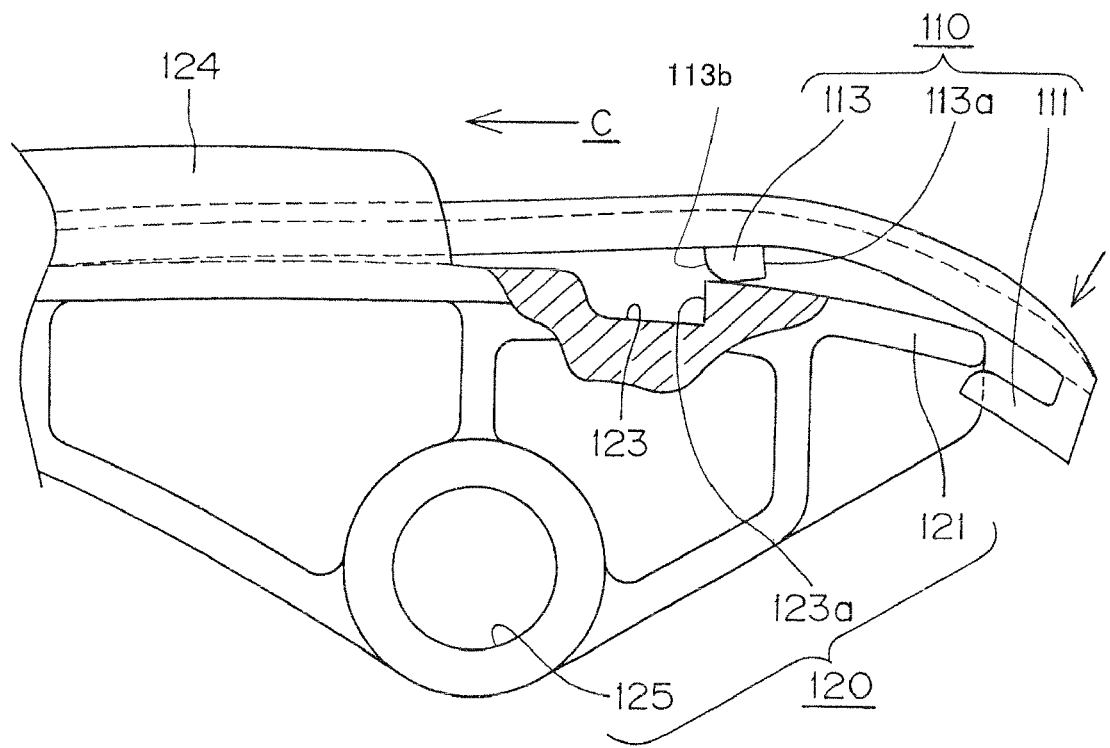

As shown in FIG. 8, to engage the chain entry ends of the shoe and base, the chain entry end 111 is moved in the direction opposite to the direction C of chain travel, beyond the entry end 121 of the base. Then, as shown in FIG. 9, the chain entry end 111 of the shoe is flexed so that its hook can receive the chain entry end 121.

Figure 10:
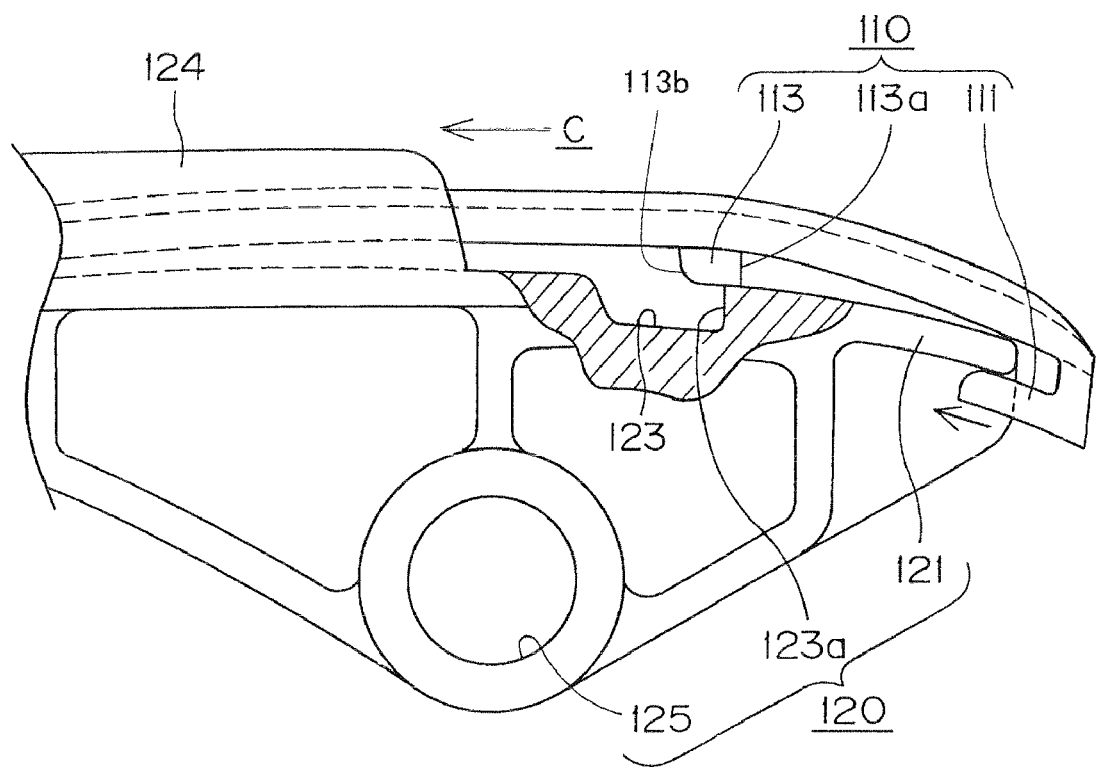
Figure 11:
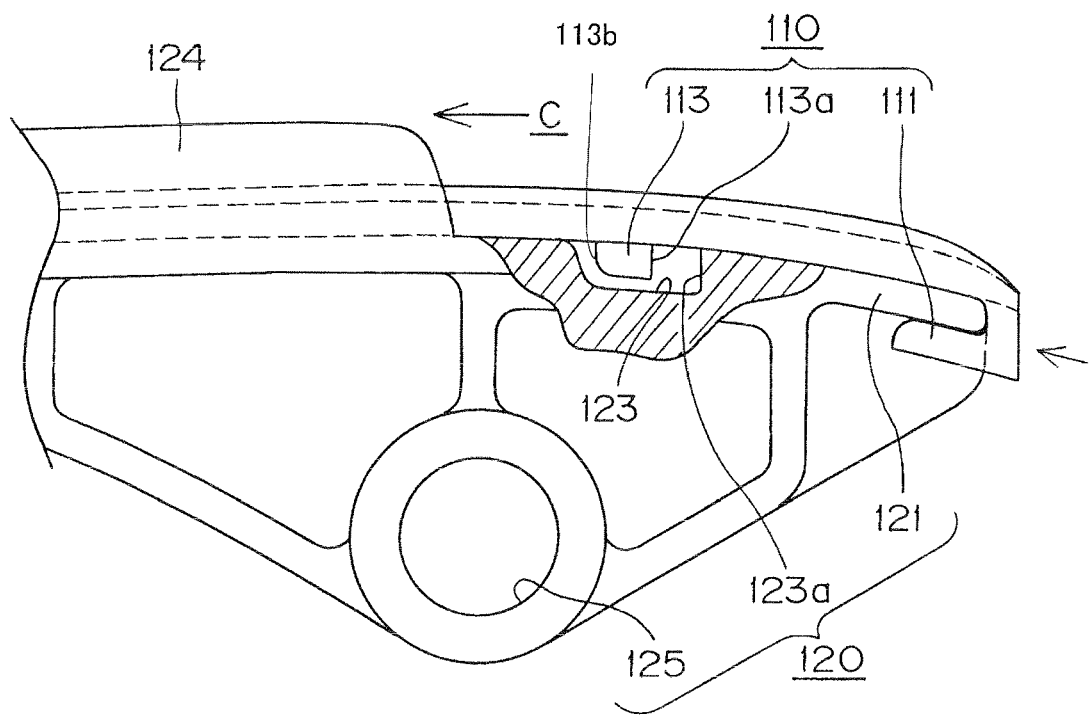

As shown in FIG. 10, the shoe 110 is moved relative to the base in the direction C of chain movement so that the chain entry end of the base is received by the hook structure at the chain entry end of the shoe. When the chain entry end of the base approaches full engagement with the hook structure at the chain entry end of the shoe, as shown in FIG. 11, the projection 113 of the shoe 110 drops into the depression 123 of the base 120. At the same time, the shoe, which had been flexed as shown in FIGS. 9 and 10 relaxes, and the projection 113 is retained in depression 123. Flexing of the portion of the shoe adjacent the chain entry end against the resilience of the shoe is required for removal of the shoe from the base. Such flexing can be deliberately carried out for removal of the shoe from the base when the chain guide becomes worn and needs to be replaced, thereby making it possible to recycle the shoe and base materials.

Figure 12:
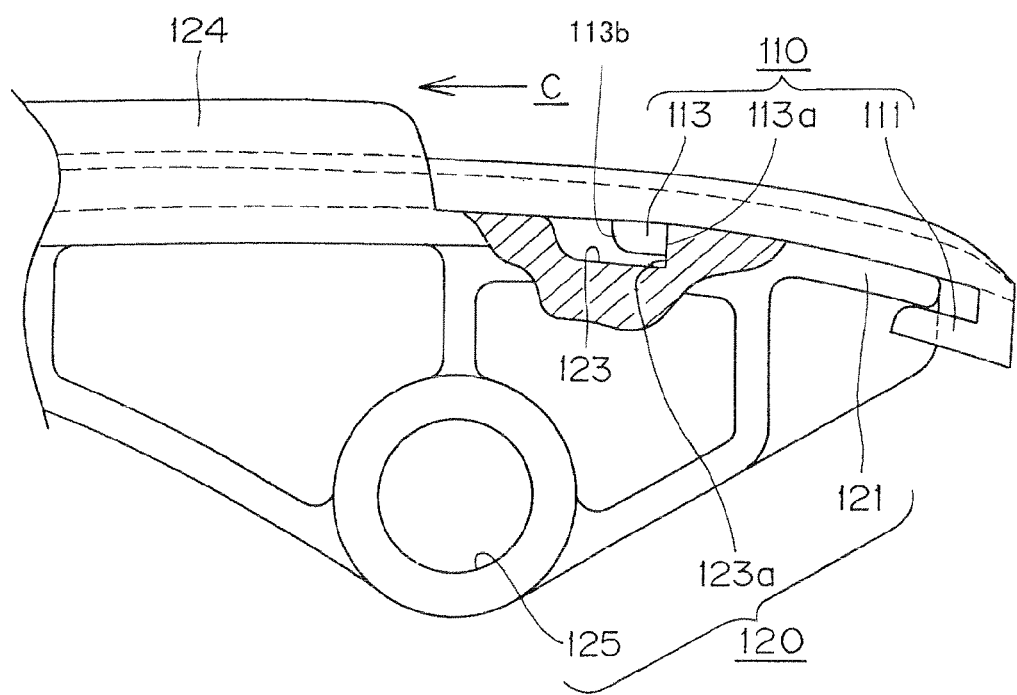

The disconnection-preventing locking surface 113a formed on projection 113 can engage the locking surface 123a formed on depression 123, as shown in FIG. 12, preventing excessive shift of the shoe relative to the base in a direction opposite to the direction C of chain travel. Mounting of the shoe 110 onto the base 120 entails engagement of their chain exit end portions, flexing of the chain entry end portion of the shoe, and a small longitudinal movement of the shoe relative to the base until the projection 113 snaps into depression 123. Thus, the connection of the shoe with the base is relatively easy, while inadvertent disconnection of the shoe from the base is prevented.

Since the projection 113 on the shoe, and the depression 123 on the base are disposed near the chain entry ends of the shoe and base respectively, flexion of the shoe enables the base to be engage with the shoe while ensuring that the projection 113 is firmly engaged with the depression 110. Thus, assembly of the shoe 110 and the base 120 is carried out easily attained. Furthermore, the positions of the projection and depression ensure that the shoe is resistant to the influence of thermal expansion and shrinkage, enables the parts to be produced with relaxed size tolerances, while achieving excellent dimensional stability in the chain guide.

What is claimed is:
1. A chain guide for use in an engine, the chain guide comprising:
   an elongated shoe having a front surface for sliding contact with a transmission chain travelling along the direction of elongation of the shoe, a back surface opposite from said front surface, and a pair of side edges extending in the direction of elongation of the shoe; and
   an elongated base supporting the shoe, the base having a front surface engaged with the back surface of the shoe along the direction of elongation of the shoe, a back surface, and a pair of opposed, parallel, side wall ribs extending from the front surface of the base, the ribs being elongated in the direction of elongation of the base, and spaced from each other by a distance substantially equal to the width of the shoe, whereby the ribs, by engaging the side edges of the shoe, limit lateral movement of the shoe with respect to the base while the back surface of the shoe is engaged with the front surface of the base, said base, the base also having opposite chain entry and chain exit ends spaced from each other along the direction of elongation of the base, whereby the base can be mounted so that a traveling chain moves from the chain entry end toward the chain exit end, the front surface of the base also having a depression formed therein;
   wherein the shoe is in a first longitudinal position relative to the base and has a chain entry end engaged with the chain entry end of the of the base, a chain exit end engaged with the chain exit end of the base, and a projection on the back surface of the shoe, the projection extending into the depression in the front surface of the base;
   the chain guide further including first hook formed on the shoe at the chain entry end thereof, and a second hook formed on the shoe at the chain exit end thereof, said hooks having base back-engaging portions engaged with the back surface of the base, said base back-engaging portions being spaced longitudinally from each other by a distance less than the length of the base, whereby said hooks are simultaneously engaged with the respective chain entry end and chain exit ends of the base when the shoe is in said first longitudinal position relative to the base, and said shoe being positionable, while between said side wall ribs, in a second longitudinal position relative to the base in which the second hook is engaged with the chain exit end of the base while the first hook is disengaged from the base and said projection on the back surface of the shoe is engaged with the front surface of the base;
   wherein the projection and depression have locking surfaces, the locking surfaces being mutually engageable, when the shoe is in said first position relative to the base, to limit sliding movement of the shoe relative to the base in a direction toward the chain entry end of the base, and thereby preventing disconnection of first hook from the chain entry end of the base; and wherein at least a portion of the shoe located between the projection and the chain entry end of the shoe is sufficiently flexible to allow the first hook to be moved into a position such that it can be engaged with the entry end of the base by longitudinal movement of the shoe relative to the base from said first position toward said second position while the projection is engaged with the front surface of the base at a location spaced longitudinally from said depression.

2. A chain guide according to claim 1, in which said depression is spaced toward the chain entry end of the base from a location mid way between the chain entry and chain exit ends of the base, and the projection is spaced toward the chain entry end of the shoe from a location mid way between the chain entry and chain exit ends of the shoe.

3. A chain guide according to claim 1, wherein the locking surface of the projection faces toward the chain entry end of the shoe, and wherein the projection has a rounded surface facing toward the chain exit end of the shoe.

* * * * *